Inventors
STANLEY BRUCE MARSH
ALLAN STANLEY WILTSHIRE
By Cushman, Darby & Cushman
ATTORNEYS Aug. 9, 1966 S. B. MARSH ET AL 3,265,985

MICROWAVE OSCILLATOR HAVING FREQUENCY AND AMPLITUDE STABILIZATION MEANS

Filed Dec. 19, 1961 2 Sheets-Sheet 2

Inventors
STANLEY BRUCE MARSH
ALLAN STANLEY WILTSHIRE
By Cushman, Darby & Cushman
ATTORNEYS 3,265,985
Patented August 9, 1966

3,265,985

MICROWAVE OSCILLATOR HAVING FREQUENCY AND AMPLITUDE STABILIZATION MEANS

Stanley Bruce Marsh and Allan Stanley Wiltshire, Malvern, England, assignors to Minister of Aviation in Her Majesty's Government of the United Kingdom of Great Britain and Northern Ireland, Strand, London, England Filed Dec. 19, 1961, Ser. No. 160,491
Claims priority, application Great Britain, Dec. 30, 1960, 44,872/60
11 Claims. (Cl. 331—6)

This invention relates to the stabilisation of electronic oscillators and has reference to oscillators from which it is desired to obtain a high power oscillation, at a controlled frequency and with low noise modulation side bands in the range of frequencies known in the radar field as the Doppler band, e.g. 1–60 kc./s.

Generally oscillators used in the transmitters of CW radar systems comprise a klystron oscillator followed by a klystron amplifier. Conventional stabilisation techniques are not very effective when applied to such transmitters owing to the stringent low-noise requirements which must be met to avoid false Doppler signals in the radar system due to signals from ground clutter. For instance a 2 kw. CW automatic tracking radar transmitter may consist of a two-resonator klystron oscillator followed by two two-resonator klystron amplifiers in cascade; power levels are set by power dividers to determine the input to the intermediate amplifier and optimum drive to the final amplifier. The transmitter is used in a CW radar system in which target selection is made by measurement of Doppler shift in reflected signals, the Doppler frequencies lying in the range 1–60 kc./s. In order that reflections from ground clutter shall not give rise to false signals in the Doppler band it is desirable that within this band the random amplitude modulation of the transmitter shall not give rise to sideband power exceeding the thermal noise in the receiver bandwidth when the centre frequency of that bandwidth is anywhere in the Doppler band utilised e.g. 1–60 kc./s. Random frequency modulation is similarly limited in sideband power.

Frequency and amplitude noise modulation which occurs in such a transmitter has been identified with fluctuations of the current in the electron beams in the oscillator and amplifier valves and is random in character. It is clearly necessary to reduce this noise modulation and close attention in the manufacture of the valves to avoidance of dust within the vacuum envelope results in a considerable improvement; but further reduction still appears most desirable if the full potentialities of the transmitters are to be realised.

It is an object of the present invention therefore to provide an improved means for stabilising electronic oscillators.

It has been realised that the random frequency modulation noise arises mainly in the oscillator of a CW transmitter and the random amplitude modulation noise arises mainly in the amplifier following the oscillator of the CW transmitter.

Accordingly there is provided in the present invention a stabilised oscillator comprising, a basic oscillator having means for controlling its frequency of oscillation in response to a first controlling signal, an output amplifier having means for controlling its output amplitude in response to a second controlling signal, the basic oscillator feeding its output to the amplifier and means for producing error signals indicating frequency error and amplitude error in the output oscillation of the stabilised oscillator and for applying them to the basic oscillator and the amplifier respectively to control the output frequency and amplitude.

Conveniently the oscillator is a two-cavity klystron, the amplifier a two-or-four cavity klystron whose output amplitude is controlled by a ferrite or semiconductor amplitude modulator device; frequency control of the oscillator is by control of the E.H.T. voltage applied to it—this introduces negligible amplitude variation—and control of the amplitude modulator is by means of a current passing through the coil of a ferrite modulator device or a voltage applied to a terminal of a semiconductor-modulator device.

The means for producing error signals is conveniently a frequency discriminator of the bridge type described in a paper read before the Institution of Electrical Engineers Conference on Microwave Measurements held in London September 6–8, 1961: "The Use of a Microwave Discriminator in the Measurement of Noise Modulation," and the subject of U.S. Patent No. 3,079,563, Feb. 26, 1963, Stanley Bruce Marsh and John Dickens Clare.

A D.C. signal derived separately from the frequency error signal may be used to control the E.H.T. voltage of the oscillator to control the mean oscillation frequency; this also maintains the discriminator bridge in balance.

An isolator may be provided between the basic oscillator and the amplifier to reduce pulling of the oscillator and consequent frequency modulation noise incurred by variation of the amplifier beam current.

In order to make the invention clearer an example of a stabilised oscillator will now be described with reference to the accompanying drawings in which.

Figure 1:
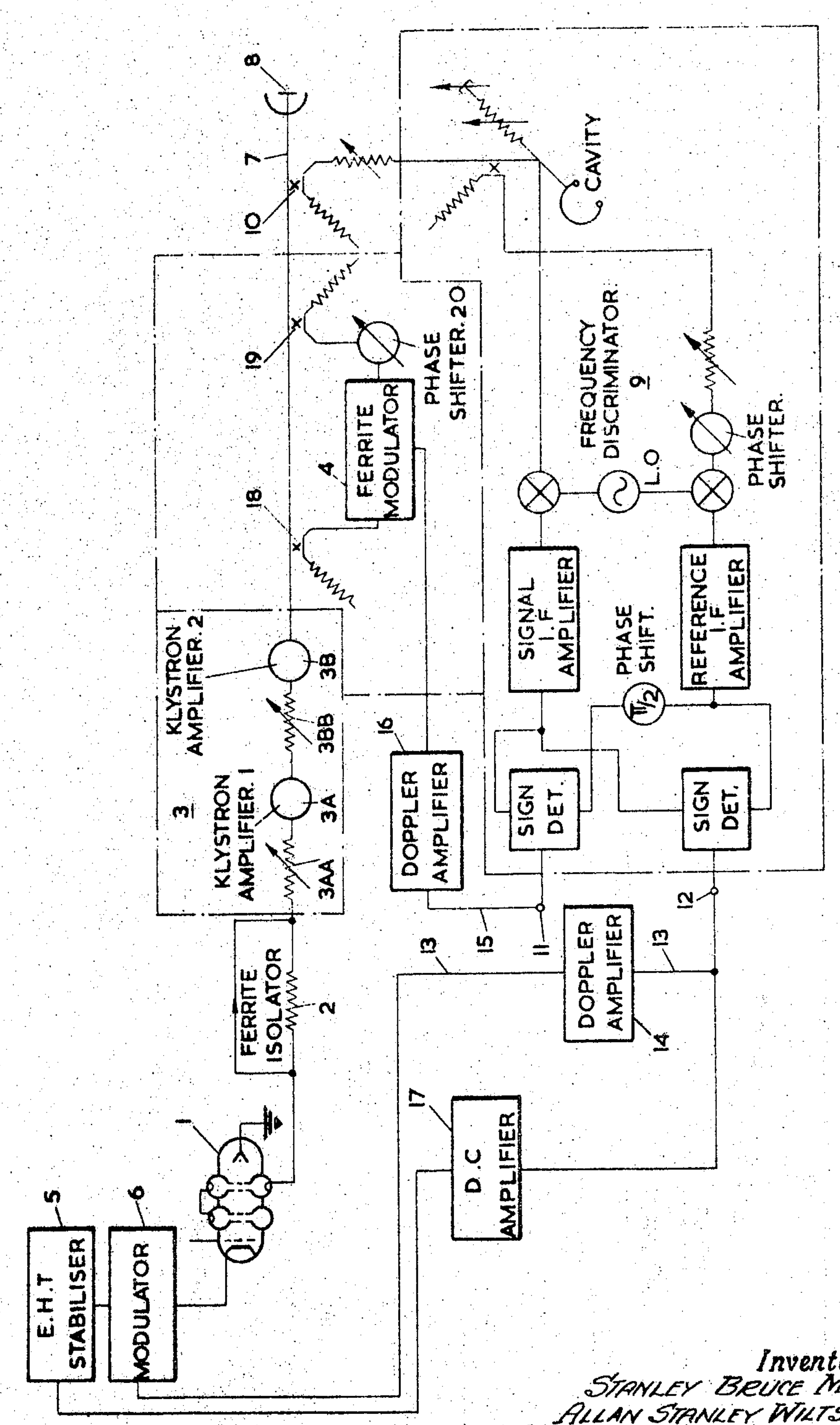
FIGURE 1 is a circuit diagram of a stabilised oscillator incorporated in a CW radar transmitter.

In FIGURE 1 an oscillator 1, conveniently of the two-cavity klystron type, the frequency of which is controlled by varying the E.H.T. voltage on its reflector is connected via a ferrite isolator 2 to a two-klystron amplifier 3 consisting of two stages 3A, 3B; level adjusting impedances 3AA, 3BB are provided at the input to each stage.

An E.H.T. stabiliser circuit 5, comprising a voltage source substantially independent of power and load variation, ripple, etc., stabilises the E.H.T. of the oscillator 1, and a voltage modulator 6 is provided in series with the stabilised E.H.T. supply to the oscillator 1.

A small fraction of the output of the second amplifier stage 3B is passed through a ferrite modulator 4 by means of a directional coupler 18, a portion of the output of the modulator 4 being fed back into a main output waveguide 7 by means of a directional coupler 19 through a phase shifter 20. In a typical example the couplers 18 and 19 each have a coupling ratio of 23 db. The ferrite modulator may be of conventional construction; an example of a suitable modulator is described by A. L. Morris in an article in Journal Brit. I.R.E., vol. 19, No 2, February 1959, page 117.

The controlled output of the amplifier 3 is fed via the output waveguide 7 to a utilisation means 8, in the present example a transmitter aerial.

A microwave suppressed carrier frequency discriminator 9 of the bridge type described in U.S. Patent No. 3,079,563, Feb. 26, 1963, Stanley Bruce Marsh and John Dickens Clare, is coupled at its input directional coupler 10 to the transmitter output waveguide 7. An output 12 provides a signal indicating frequency variation or error of the transmitter output in the waveguide 7 and an output 11 a signal indicating amplitude variation or error of the transmitter output.

We note that the basic internal arrangement of the discriminator 9 has been described and discussed at length in the Marsh and Wiltshire paper to the I.E.E. (loc. cit.) and U.S. Patent No. 3,079,563, Feb. 26, 1963, Stanley Bruce Marsh and John Dickens Clare, in the interests of brevity, will not be referred to in the same detailed manner here, except to mention that the measurements of FM noise modulation and AM noise modulation, used in the paper and patent, respectively denote similar measurements to those of frequency error and amplitude error referred to in the present specification.

A connection 13 which includes a Doppler frequency amplifier 14, typically 1–60 kc./s. bandwidth, is made between the frequency error output 12 of the discriminator 9 and the E.H.T. modulator 6 of the oscillator 1 and a connection 15 which includes a Doppler frequency amplifier 16 (typically 1–60 kc./s. bandwidth) is made between the amplitude error output 11 of the discriminator 9 and the ferrite modulator 4.

A D.C. amplifier 17 also is connected to the frequency error output 12 and feeds a D.C. control signal to the E.H.T. stabiliser circuit 5.

In operation the output of the oscillator 1 is amplified by the amplifier 3 and fed as a transmitter output signal via the waveguide 7 to the aerial 8.

A sample of the transmitter output signal passes into the frequency discriminator 9 by virtue of the directional coupler 10 and signals are obtained at the outputs 11 and 12 of the discriminator 9 which indicate amplitude and frequency error in the transmitter output signal.

The frequency error signal (output 12) passes through the amplifier 14 to the modulator 6 and a control loop is thereby completed for controlling the frequency of the oscillator 1. The control is effective, by virtue of the amplifier 14, over the range of Doppler frequencies covered by the amplifier.

The amplitude error signal (output 11) passes through the amplifier 16 to the ferrite modulator 4 which controls the feeding of a small quantity of energy from the waveguide 7 via the coupler 18 back into the waveguide 7 via the coupler 19. The control loop so formed is brought into adjustment by means of the phase adjuster 20 and is effective in controlling the amplitude of the output of the amplifier 3. Again this control acts, by virtue of the amplifier 16, over the range of Doppler frequencies covered by the amplifier.

Thus the transmitter is stabilised against variations of frequency and amplitude occurring at frequencies within the Doppler range.

The frequency error signal fed to the E.H.T. stabilising circuit 5 via the D.C. amplifier 17 controls the mean frequency of the oscillator 1; also at the same time, because the error signal output of the D.C. amplifier 17 is proportional to any unbalance which exists in the bridge of the frequency discriminator 9 the balance of the bridge is automatically maintained.

Although a frequency discriminator has been described for producing amplitude error signals a receiver of the superheterodyne type with an envelope detector at intermediate frequency may be used instead. This would give a uniform sensitivity over the Doppler frequency band (1–60 kc./s. in the present example).

It should be noted, however, that the use of the frequency discriminator having an R.F. discriminator and IF phase sensitive detectors (the sign detectors of the discriminator 9) with the reference carrier in quadrature with the reference carrier used for deriving the frequency error signal, results in a sensitivity which improves as the modulating frequency increases at the rate of 6 db per octave; as long as time delay in the discriminator is substantially less than a quarter period of the highest noise modulation frequency (i.e. of the highest frequency of the frequency error signal). This sensitivity characteristic is most advantageous in a CW radar transmitter as it is of the form which reduces the effects of long range clutter.

If we consider the more detailed design of the example of a stabilised oscillator we see that it is not strictly essential that the D.C. and Doppler frequency amplifiers 17, 14 in the frequency error loop are separate amplifiers: but in practice it is preferable that they should be, so that with finite and reactive output impedance of the klystron power supply, high stable gain may be maintained. The gain of the overall control loop in which the frequency error signal is effective is limited mainly by time delay in the discriminator itself. The low frequency response of the loop is limited by the output impedance of the power supply.

The maximum gain of the amplitude error loop incorporating a discriminator in the circuit shown is similarly limited by time delay in the discriminator.

Figure 2:
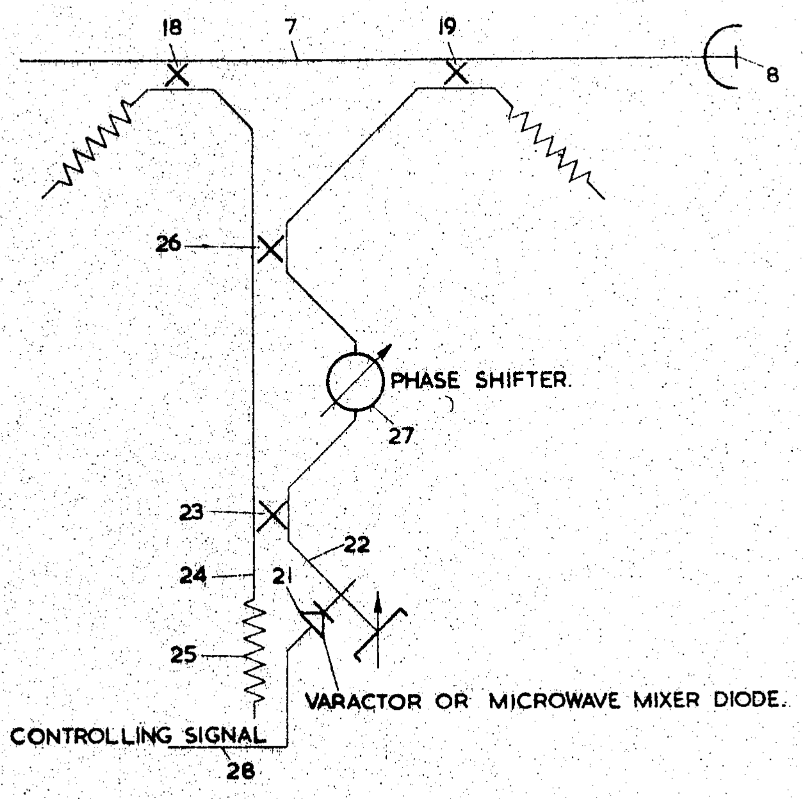
FIGURE 2 is a circuit diagram of an alternative part of the circuit shown in FIGURE 1.

As an alternative to the ferrite modulator 4 of the circuit described with reference to FIGURE 1 a semiconductor modulator may be employed as shown in FIGURES 2 and 4. In FIGURE 2*a* a semiconductor diode 21 of the so-called varactor type or of the type used in microwave mixer circuits is located in the waveguide of an output arm 22 of a directional coupler 23 the other output arm 24 being terminated by a dummy load 25. The input arms of the directional coupler 23 are connected to the output arms of a second directional coupler 26, a variable phase-shifter 27 being provided conveniently in one of the connections between the input arms of the first coupler 23 and the output arms of the second coupler 26.

Figure 3:
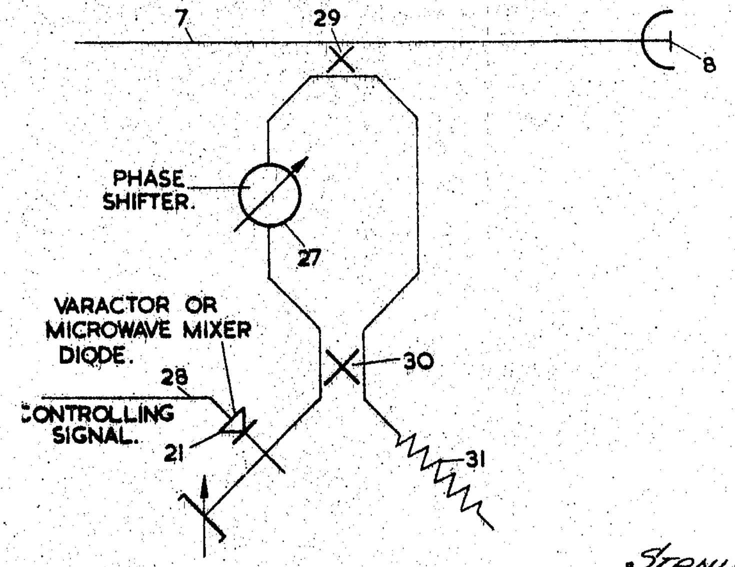
FIGURE 3 is a circuit diagram of another alternative part of the circuit shown in FIGURE 1.

The input arms of the second coupler are connected in the stabilised oscillator circuit described to those arms of the couplers 18 and 19 which are connected to the ferrite modulator 4 and the phase shifter 20 respectively. The modulator 4 and the phase-shifter 20 are, of course, not then included and the output 28 of the Doppler amplifier 16 is connected to one terminal of the varactor or mixer type diode 21, the other of which is connected to a suitable potential source. In FIGURE 3, which is another alternative to the ferrite modulator, a 20 db directional coupler 29 is substituted for the two couplers 18 and 19 of the circuit described and its parallel input and output arms are connected to the input arms of a 17 db directional coupler 30 the output arms of which are connected correspondingly to a varactor or mixer-type diode 21 and a dummy load 31. The diode, as in the previous example, is connected to the output 28 of Doppler amplifier 16, the ferrite modulator 4 and the phase shifter 20 not then of course being used.

In general, improvements in stabilisation obtained depend upon the sensitivity of the discriminator, which in turn is determined by the magnitude of the signal which can be applied to it. Thus improvement of the balance of the discriminator bridge improves the sensitivity and the improved arrangement described in U.S. Patent No. 3,197,707, issued on July 27, 1965, to A. S. Wiltshire and S. A. Drage may be employed to advantage here.

It will be appreciated that, in the example described, the amplifier 3 forms part of the frequency error control loop. This is not, of course, strictly necessary as the frequency error information can be obtained from the output of the oscillator 1; however, the frequency modulation noise in the amplifier 3, although small, is not small relative to that which occurs in the frequency controlled oscillator and it is preferred therefore that the amplifier form part of the control loop.

What we claim is:

1. A stabilised microwave oscillation generator including an oscillator circuit operative at microwave frequencies and subject to amplitude and frequency errors in its output, comprising:

a microwave discriminator means connected to the output of said oscillator circuit and operative on said output for generating error signals in the form of a first output indicative of said amplitude error in the output of said oscillator circuit and a second output indicative of said frequency error in said oscillator output, control means connected to said first output for controlling the microwave output amplitude of said oscillator circuit, and
control means connected to said second output for controlling the microwave frequency of oscillation of said oscillator circuit,
said oscillator circuit including amplifying means for controlling the output amplitude of said oscillator circuit,
said amplifying means including an output signal channel comprising a main waveguide and a branch waveguide,
the branch waveguide having an input and an output means each connected to the main waveguide,
said amplitude controlling means including a modulator in said branch waveguide connected to said first output and phase adjusting means in said branch waveguide.

2. A stabilised oscillation generator as claimed in claim 1 wherein the said oscillator circuit includes a klystron and the said means for controlling the frequency of oscillation thereof includes means for controlling the reflector voltage of said klystron.

3. A stabilised oscillation generator as claimed in claim 1 wherein said oscillator circuit includes a klystron; and wherein said means for controlling the frequency of oscillation of said oscillator circuit comprises a stabilised voltage source and associated voltage modulator means for supplying reflector voltage to said klystron, means for operatively connecting a direct current component of said second output to the stabilised voltage source, and means for connecting an alternating current component of said second output to said voltage modulating means.

4. A stabilised microwave oscillator generator as claimed in claim 1 wherein said modulator in said branch waveguide is a ferrite waveguide modulator.

5. A stabilised microwave oscillator generator as claimed in claim 1 wherein said modulator in said branch waveguide is a semiconductor modulator.

6. A stabilised oscillation generator as claimed in claim 5 wherein the said oscillator circuit includes a klystron and the said means for controlling the frequency of oscillation thereof includes means for controlling the reflector voltage of said klystron.

7. A stabilised oscillation generator as claimed in claim 5 wherein the semiconductor modulator comprises a diode of the varactor type.

8. A stabilised oscillation generator as claimed in claim 5 wherein the semiconductor modulator comprises a diode of the microwave mixer type.

9. A stabilised oscillation generator as claimed in claim 5 wherein said oscillator circuit includes a klystron; and wherein said means for controlling the frequency of oscillation of said oscillator circuit comprises a stabilised voltage source and associated voltage modulator means for supplying reflector voltage to said klystron, means for operatively connecting a direct current component of said second output to the stabilised voltage source, and means for connecting an alternating current component of said second output to said voltage modulating means.

10. A stabilised microwave oscillation generator including an oscillator circuit operative at microwave frequencies and subject to amplitude and frequency errors in its output, comprising:
a microwave discriminator means connected to the output of said oscillator circuit and operative on said output for generating error signals in the form of a first output indicative of said amplitude error in the output of said oscillator circuit and a second output indicative of said frequency error in said oscillator output,
control means connected to said first output for controlling the microwave output amplitude of said oscillator circuit, and
control means connected to said second output for controlling the microwave frequency of oscillation of said oscillator circuit,
said oscillator circuit including amplifying means for controlling the amplitude of said oscillator circuit,
said oscillator circuit including a klystron, and
said control means for controlling the microwave frequency of oscillation includes means for controlling the reflector voltage of said klystron.

11. A stabilised microwave oscillation generator including an oscillator circuit operative at microwave frequencies and subject to amplitude and frequency errors in its output, comprising:
a microwave discriminator means connected to the output of said oscillator circuit and operative on said output for generating error signals in the form of a first output indicative of said amplitude error in the output of said oscillator circuit and a second output indicative of said frequency error in said oscillator output,
control means connected to said first output for controlling the microwave output amplitude of said oscillator circuit, and
control means connected to said second output for controlling the microwave frequency of oscillation of said oscillator circuit,
said oscillator circuit including amplifying means for controlling the output amplitude of said oscillator circuit,
said oscillator circuit including a klystron, and
said means for controlling the microwave frequency of oscillation of said oscillator circuit comprises a stabilised voltage source and associated voltage modulator means for supplying reflector voltage to said klystron,
means for operatively connecting a direct current component of said second output to the stabilised voltage source, and
means for connecting an alternating current component of said second output to said voltage modulating means.

References Cited by the Examiner

UNITED STATES PATENTS

| | | | |
|---|---|---|---|
| 2,172,456 | 9/1939 | Schock | 331—15 |
| 2,713,122 | 7/1955 | Henley | 331—6 |
| 2,931,900 | 4/1960 | Goodman | 331—15 |

ROY LAKE, *Primary Examiner.*